(12) United States Patent
Suzuki (10) Patent No.: US 8,279,223 B2
(45) Date of Patent: Oct. 2, 2012

(54) IMAGE PROCESSING APPARATUS, IMAGE PROCESSING METHOD AND PROGRAM

(75) Inventor: Kazuyoshi Suzuki, Tokyo (JP)

(73) Assignee: Sony Corporation (JP)

( * ) Notice: Subject to any disclaimer, the term of this patent is extended or adjusted under 35 U.S.C. 154(b) by 10 days.

(21) Appl. No.: 11/474,858

(22) Filed: Jun. 26, 2006

(65) Prior Publication Data

US 2007/0008562 A1 Jan. 11, 2007

(30) Foreign Application Priority Data

Jul. 6, 2005 (JP) .................................. 2005-197731

(51) Int. Cl.
*G06T 17/00* (2006.01)

(52) U.S. Cl. ......... 345/428; 345/698; 358/1.9; 358/3.13

(58) Field of Classification Search .................. 345/698, 345/691, 694; 358/1.9, 3.13
See application file for complete search history.

(56) References Cited

U.S. PATENT DOCUMENTS

| | | | | |
|---|---|---|---|---|
| 6,034,481 A * | 3/2000 | Haynes | ....................... | 315/169.3 |
| 6,108,122 A * | 8/2000 | Ulrich et al. | ................... | 345/691 |
| 6,362,834 B2 * | 3/2002 | Ishii | ............... | 345/690 |
| 6,542,141 B1 * | 4/2003 | Mano et al. | ...................... | 345/89 |
| 6,559,839 B1 * | 5/2003 | Ueno et al. | ..................... | 345/213 |
| 6,906,852 B1 * | 6/2005 | Russell | .......................... | 359/298 |
| 7,190,380 B2 * | 3/2007 | Damera-Venkata et al. | . | 345/698 |
| 2003/0002739 A1 * | 1/2003 | Loce et al. | ..................... | 382/216 |
| 2004/0179030 A1 * | 9/2004 | Cole et al. | ...................... | 345/698 |
| 2004/0263502 A1 * | 12/2004 | Dallas et al. | ................... | 345/204 |
| 2006/0145975 A1 * | 7/2006 | Kempf et al. | .................... | 345/84 |
| 2006/0229744 A1 * | 10/2006 | Patzwald et al. | ................ | 700/59 |

FOREIGN PATENT DOCUMENTS

| JP | 05108814 A | 4/1993 |
|---|---|---|
| JP | 07123322 A | 5/1995 |
| JP | 10232929 A | 9/1998 |
| JP | 2002010278 A | 1/2002 |
| JP | 2003259253 A | 9/2003 |
| JP | 2004194286 A | 7/2004 |
| JP | 2005070597 A | 3/2005 |
| JP | 2005077956 A | 3/2005 |

OTHER PUBLICATIONS

Office Action from Japanese Application No. 2005-197731, dated Aug. 9, 2011.
Office Action from Japanese Application No. 2005-197731, dated Jan. 10, 2012.
Office Action from Japanese Application No. 2005-197731, dated Oct. 25, 2011.

* cited by examiner

*Primary Examiner* — Xiao M. Wu
*Assistant Examiner* — Phi Hoang
(74) *Attorney, Agent, or Firm* — Lerner, David, Littenberg, Krumholz & Mentlik, LLP (57) ABSTRACT

An image processing apparatus capable of displaying image data on a display device that has resolution lower than that of the image data, includes a processor that categorizes image data of one screen into a plurality of groups by setting two or more pixels of the image data being mutually adjacent on the screen as one group and that outputs data to be displayed time-divisionally and sequentially on one pixel of the display device respectively based on data of the pixels in each of the groups.

6 Claims, 10 Drawing Sheets

IMAGE PROCESSING APPARATUS, IMAGE PROCESSING METHOD AND PROGRAM

CROSS-REFERENCE TO RELATED APPLICATIONS

The present application claims priority from Japanese Patent Application No. JP 2005-197731 filed on Jul. 6, 2005, the disclosure of which is hereby incorporated by reference herein.

BACKGROUND OF THE INVENTION

The present invention relates to an image processing apparatus, an image processing method and the like to display image data on a display device that has resolution lower than that of the image data.

At present, in the case where a person photographs an image or obtains an image through broadcast and internet, the display resolution of that image data is typically different from the resolution of a display device actually displaying that image data. Particularly, there are many cases in which image data of high resolution are displayed on a display device of low resolution, such as a case in which image data photographed with a digital camera having an imaging device of several million pixels are displayed on an LCD (Liquid Crystal Display) of a mobile phone unit having limited display size and a limited number of pixels.

In the past, scaling has been performed by averaging a plurality of pixels and by linear interpolation, in the case where image data of high resolution is thus displayed on a display device of low resolution (for example, refer to Patent Reference 1).

Figure 1:
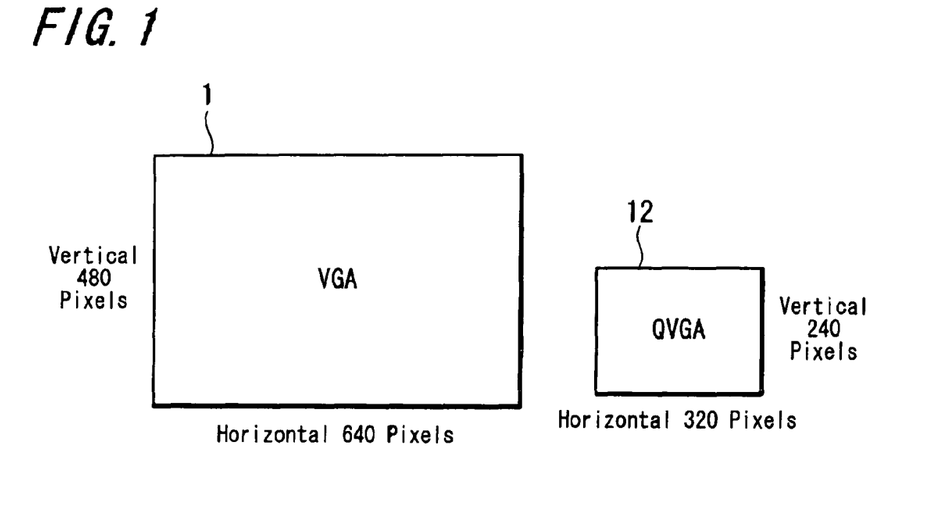
FIG. 1 is a diagram showing an example of image data of high resolution and a display device of low resolution.

This method of related art is explained with respect to a case in which what is called VGA image data 11 of horizontal 640 pixels×vertical 480 pixels (the number of total pixels are 307,200 pixels) are displayed on a QVGA display device 12 of horizontal 320 pixels×vertical 240 pixels (the number of total pixels are 76,800 pixels) as illustrated in FIG. 1.

In this case, it is typically practiced as a method of related art that values of total four pixels of horizontal two pixels and vertical two pixels in the VGA image data 11 are averaged and displayed on the QVGA display device 12.

Figure 2:
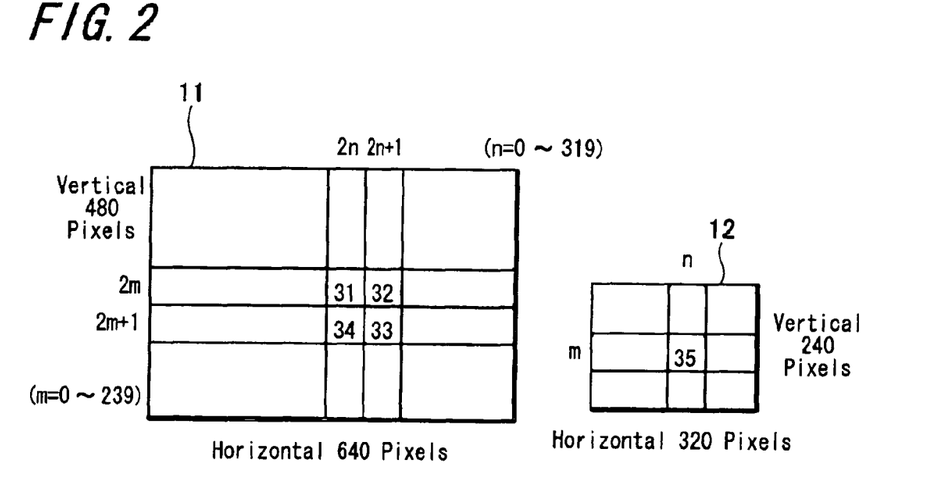
FIG. 2 is a diagram showing an example of pixels of the image data and display device in FIG. 1.

Specifically, as shown on the left side of FIG. 2, values of four pixels (pixels 31, 32, 33 and 34) in the VGA image data 11 located at positions of horizontal 2n, 2n+1 and vertical 2m, 2m+1 are averaged when the horizontal 640 pixels of the VGA are put as 0, 1, - - - 2n, 2n+1, - - - 638, 639 (n is an integer of 0 through 319) and the vertical 480 pixels are put as 0, 1, - - - 2m, 2m+1, - - - 478, 479 (m is an integer of 0 through 239).

Figure 3:
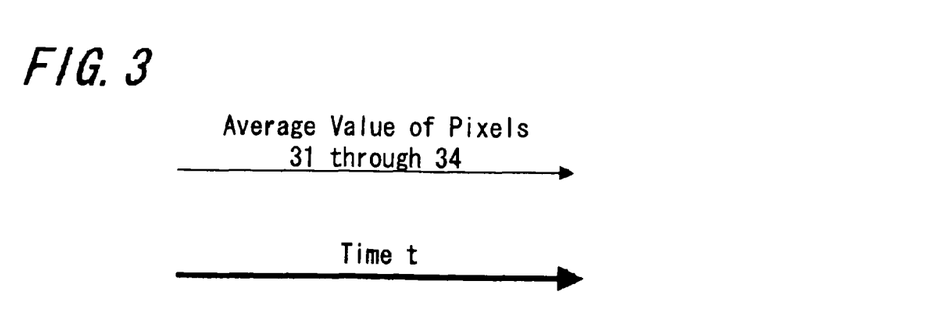
FIG. 3 is a diagram showing data to be displayed on one pixel of the display device in FIG. 2 by using a method of related art.

Then, the average value of those pixels 31 through 34 is displayed as shown in FIG. 3 on a pixel 35 located at a position of horizontal n and vertical m in the QVGA display device 12 as shown on the right side of FIG. 2. The value of the data thus displayed on the pixel 35 is constant without being chronologically changed when the VGA image data 11 constitute a still image.

The following table 1 shows a specific example of the value displayed on this pixel 35. When the values of the pixels 31 through 34 are RGB values of eight bits (0 through 255) as shown in the second through fifth rows of this table, the RGB values of the pixel 35 become values shown in the bottom row of this table.

TABLE 1

|  | R | G | B |
| --- | --- | --- | --- |
| Value of Pixel 31 | 0 | 0 | 0 |
| Value of Pixel 32 | 63 | 255 | 0 |
| Value of Pixel 33 | 127 | 0 | 255 |
| Value of Pixel 34 | 191 | 255 | 255 |
| Averaged RGB Value of Pixel 35 | 95 | 127 | 127 |

Although one pixel 35 in the QVGA display device 12 is described hereinbefore, similar processing is performed regarding all the values of n=0 through 319 and m=0 through 239, so that the VGA image data 11 can be converted and displayed on the QVGA display device 12.

[Patent Reference 1] Japanese Published Patent Application No. H10-21387 (paragraph numbers 0034 through 0038, FIGS. 1 through 3)

SUMMARY OF THE INVENTION

However, when this scaling is performed, the resolution of the original image data is lowered in a manner corresponding to the resolution of the display device. Specifically, in case of the example of FIG. 1, the resolution of the image data to be displayed on the QVGA display device 12 is lowered to one quarter of the resolution of the original VGA image data 11 (half the resolution of the image data 11 in the horizontal direction and half the resolution thereof in the vertical direction on the screen, respectively).

Accordingly, even if image data of high resolution are photographed and obtained with much effort, that high resolution is not reflected at all on the display screen.

Here, it is obvious that there is no need to lower the resolution of the original image data if a display device of high resolution is used. However, using such display device of high resolution typically incurs higher costs, and also it is difficult or may be physically impossible for a small apparatus such as a mobile phone unit, where size of a display device is restricted, to use such display device.

In view of the problems described hereinbefore, the present inventor has recognized a need for obtaining high resolution feeling in comparison to the case of related art where the scaling is performed when image data are displayed on a display device that has resolution lower than that of the image data.

According to an embodiment of the present invention, there is provided an image processing apparatus capable of displaying image data on a display device that has resolution lower than that of the image data. The image processing apparatus includes a processor for categorizing image data of one screen into a plurality of groups by setting two or more pixels being mutually adjacent on the screen as one group and for outputting data to be displayed time-divisionally and sequentially on one pixel of the display device respectively based on data of the pixels in each individual group.

Further, according to an embodiment of the present invention, there is provided an image processing method capable of displaying image data on a display device that has resolution lower than that of the image data. The image processing method includes the steps of: categorizing image data of one screen into a plurality of groups by setting two or more pixels being mutually adjacent on the screen as one group and outputting data to be displayed time-divisionally and sequentially on one pixel of the display device respectively based on data of the pixels in each individual group.

Further, according to an embodiment of the present invention, there is provided a program for making a computer execute the procedures of: categorizing image data of one screen into a plurality of groups by setting two or more pixels being mutually adjacent on the screen as one group and outputting data to be displayed time-divisionally and sequentially on one pixel of a display device respectively based on data of the pixels in each individual group.

According to an embodiment of the present invention, image data of one screen are categorized into a plurality of groups by setting two or more pixels being mutually adjacent on the screen as one group. Then, data to be displayed time-divisionally and sequentially on one pixel of a display device respectively are output based on data of the pixels in each individual group.

Each portion of data among the original image data is displayed time-divisionally and sequentially on the display device to which the output data are supplied. Focusing attention on each individual pixel of the display device, the data displayed time-divisionally are data of the pixels being mutually adjacent on the screen (the pixels in the same group) of the original image data. Inside the human brain, the data of those mutually adjacent pixels are perceived in the form that deviation is corrected between a position where the data of that pixel should be normally displayed and a position of the pixel in the display device. As a result, higher resolution feeling can be obtained in comparison to the case that performs the scaling.

Accordingly, when image data are displayed on a display device that has resolution lower than that of the image data, it is possible to obtain higher resolution feeling in comparison to the case such as related art that performs scaling.

According to an embodiment of the present invention, higher resolution feeling can be obtained in comparison to the case such as related art that performs scaling when image data are displayed on a display device that has resolution lower than that of the image data.

DETAILED DESCRIPTION

Figure 4:
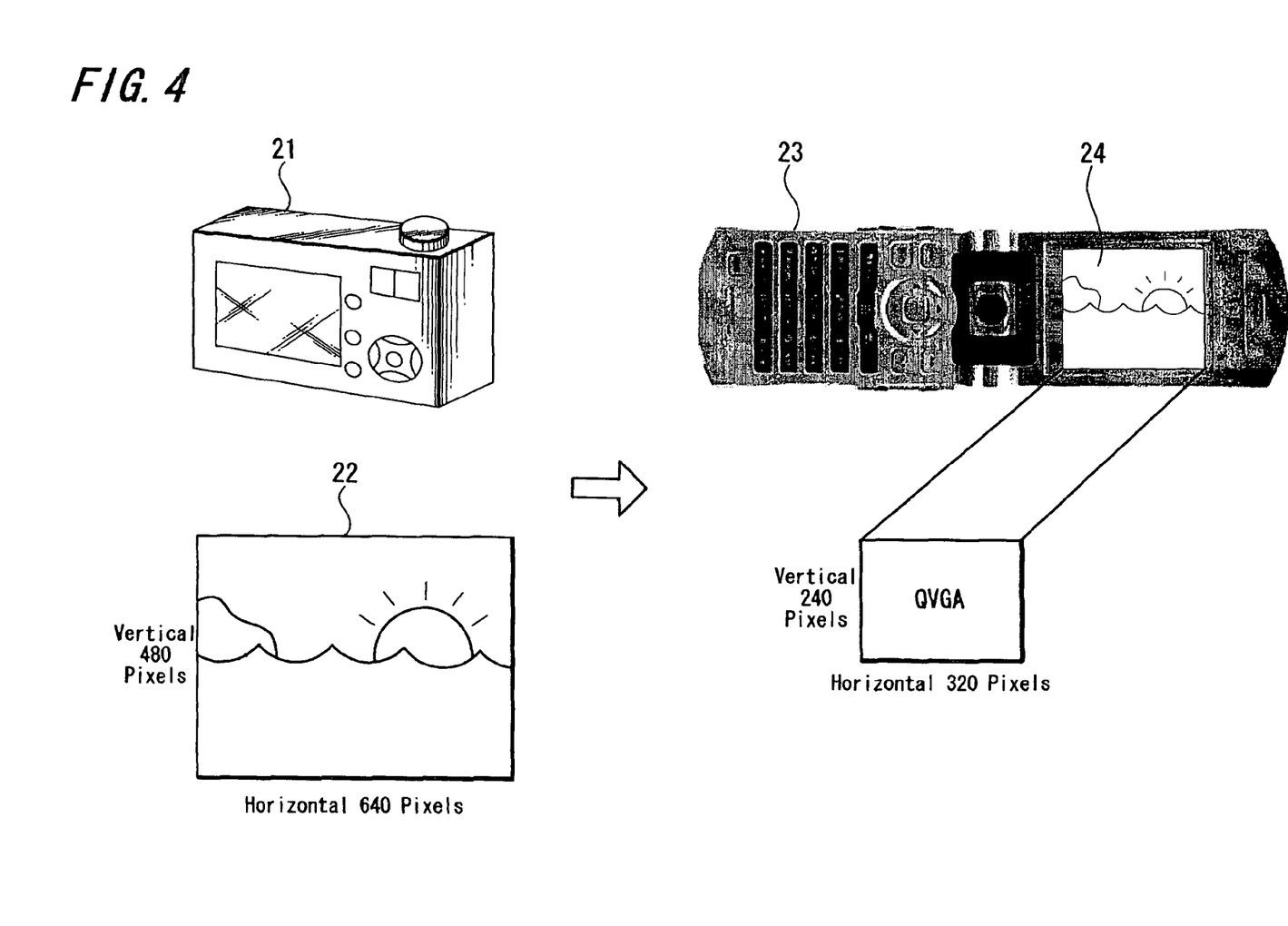
FIG. 4 is a diagram showing an example of an image display apparatus to which an embodiment of the present invention is applied.

Hereinafter, embodiments of the present invention are specifically explained by using the accompanied drawings. As shown in FIG. 4, hereinafter an explanation is made with respect to an embodiment in which the present invention is applied for displaying VGA image data (still image data) 22 photographed with a digital camera 21 on an LCD screen 24 of QVGA size provided in a mobile phone unit 23.

Figure 5:
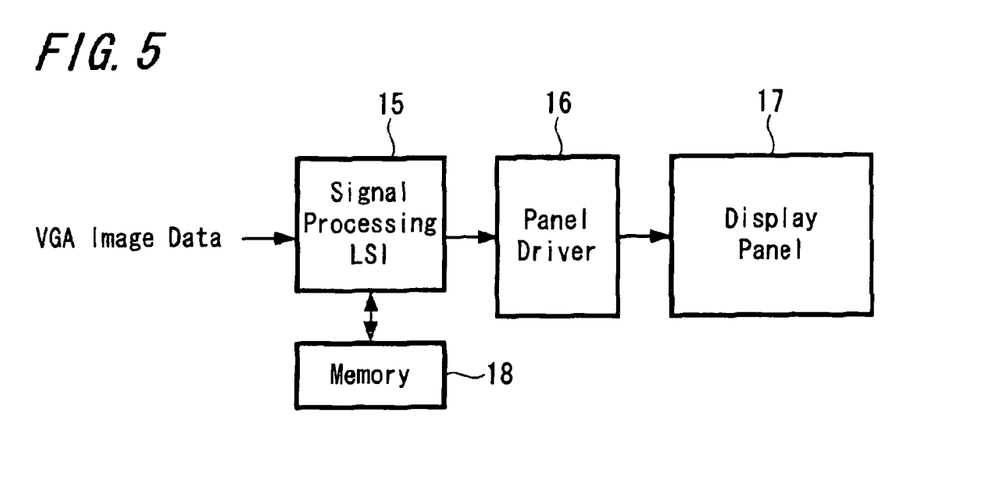
FIG. 5 is a block diagram showing an image processing system of a mobile phone unit shown in FIG. 4.

FIG. 5 is a block diagram showing an image processing system of this mobile phone unit 23. The VGA image data 22 input from the digital camera 21 of FIG. 4 through an image input terminal (not illustrated) are sent to a signal processing LSI 15.

Figure 6:
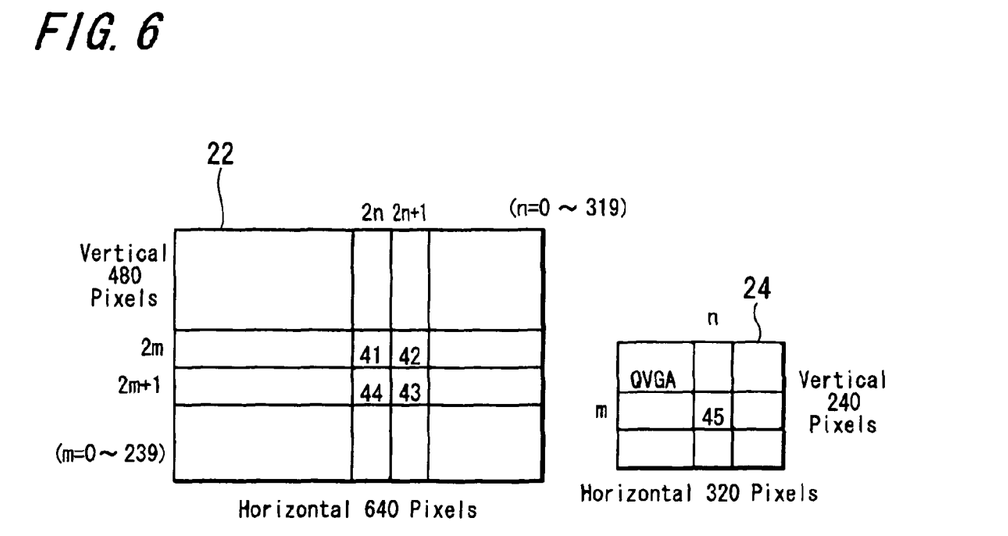
FIG. 6 is a diagram showing an example of pixels of VGA image data and LCD screen.

After writing the VGA image data 22 into a memory 18 by executing a program that is stored in an internal memory, the signal processing LSI 15 reads out the data from the memory 18 through processing explained below by using the drawings such as FIGS. 6 through 8, and displays the data on a display panel 17 (an LCD panel constituting the LCD screen 24 of FIG. 4) through a panel driver 16.

Next, the processing of the signal processing LSI 15 is explained. Horizontal 640 pixels of the VGA are put as 0, 1, 2n, 2n+1, - - - 638, 639 (n is an integer of 0 through 319) and vertical 480 pixels are put as 0, 1, 2m, 2m+1, - - - , 478, 479 (m is an integer of 0 through 239) as shown on the left side of FIG. 6. Based on data of four pixels (pixels 41, 42, 43 and 44) located at positions of horizontal 2n, 2n+1 and vertical 2m, 2m+1 of the VGA image data 22, display of pixel 45 located at a position of horizontal n and vertical m of the LCD screen 24 on the right side of FIG. 6 is performed.

At this time, data of the pixels 41, 42, 43 and 44 are not averaged as practiced in the scaling of related art, but are displayed time-divisionally and sequentially on the pixel 45.

Figure 7:
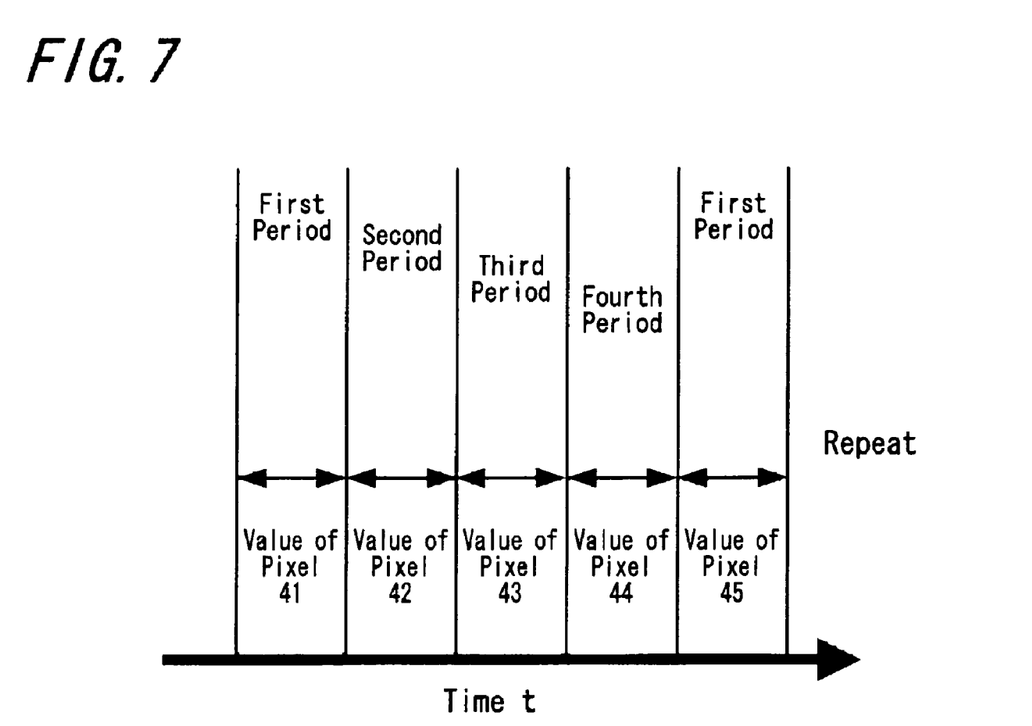
FIG. 7 is a diagram showing a method of displaying image data time-divisionally on one pixel of the LCD screen in FIG. 6.

FIG. 7 shows a method of displaying image data time-divisionally on this pixel 45. When one cycle is divided into four periods and respective periods are named as a first period, second period, third period and fourth period, data of the pixel 41 is read out from the memory 18 (FIG. 5) and displayed on the pixel 45 of the LCD screen 24 during the first period. Data of the pixel 42 is read out from the memory 18 and displayed on the pixel 45 of the LCD screen 24 during the second period. Data of the pixel 43 is read out from the memory 18 and displayed on the pixel 45 of the LCD screen 24 during the third period. Data of the pixel 44 is read out from the memory 18 and displayed on the pixel 45 of the LCD screen 24 during the fourth period. Further, this cycle of the first through fourth periods is repeated.

The following table 2 shows a specific example of the values that are displayed on this pixel 45. When the values of the pixels 41 through 44 are RGB values of eight bits (0 through 255) as shown in the second through fifth rows of this table, the RGB values of the pixel 45 become values in the sixth row of this table 2 during the first period. Similarly, the RGB values of the pixel 45 become those in the seventh row of this table 2 during the second period, those in the eighth row of this table 2 during the third period and those in the bottom row of this table 2 during the fourth period, respectively.

TABLE 2

|  | R | G | B |
|---|---|---|---|
| Value of Pixel 41 | 0 | 0 | 0 |
| Value of Pixel 42 | 63 | 255 | 0 |
| Value of Pixel 43 | 127 | 0 | 255 |
| Value of Pixel 44 | 191 | 255 | 255 |
| RGB Value of Pixel 45 during First Period | 0 | 0 | 0 |
| RGB Value of Pixel 45 during Second Period | 63 | 255 | 0 |
| RGB Value of Pixel 45 during Third Period | 127 | 0 | 255 |
| RGB Value of Pixel 45 during Fourth Period | 191 | 255 | 255 |

Although one pixel 45 of the LCD screen 24 is described hereinbefore, similar processing is performed with respect to all the values of n=0 through 319 and m=0 through 239, so that data of all the pixels included in the VGA image data 22 are displayed time-divisionally and repeatedly in sequential order on the LCD screen 24.

Specifically, four pixels being mutually adjacent on the screen, such as the pixels 41 through 44, are set as one group such that one screen of the VGA image data is categorized into a plurality of groups (here, vertical 240× horizontal 320=76,800 groups). Then, respective data for one pixel in each of the plurality of groups are displayed on the LCD screen 24 by reading out repeatedly in sequential order from the memory 18 while switching the pixels.

Figure 8:
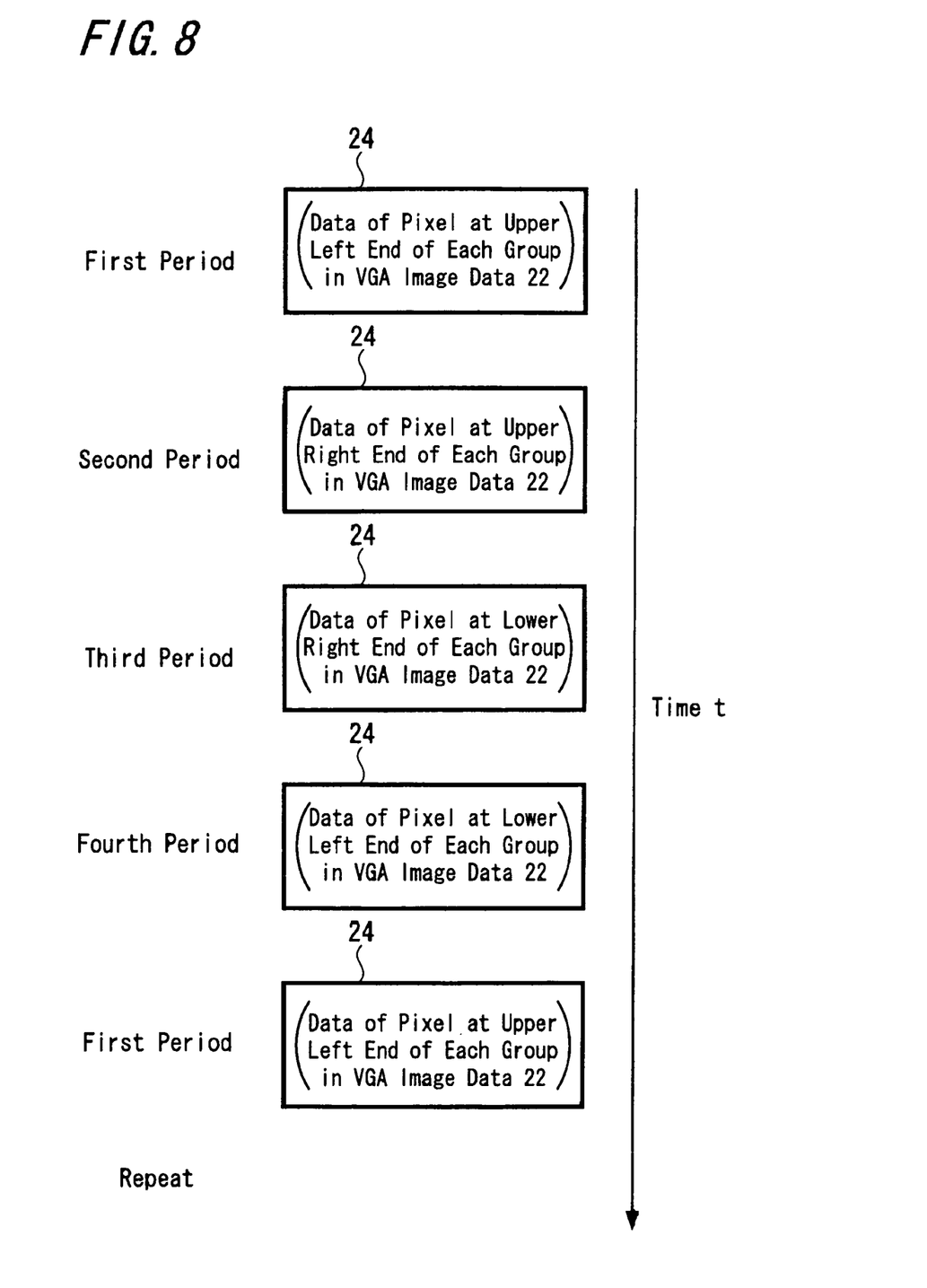
FIG. 8 is a diagram showing an image to be displayed time-divisionally on the whole LCD screen.

Accordingly, as shown in FIG. 8, when the whole LCD screen 24 is observed, an image only made from data of a pixel located at the upper left end in each group such as the pixel 41 (FIG. 6) among the pixels of the group (that is, data of total 76,800 pixels) is displayed during the first period. An image only made from data of a pixel located at the upper right end in each group such as the pixel 42 (FIG. 6) among the pixels of the group (that is, data of total 76,800 pixels) is displayed during the second period. An image only made from data of a pixel located at the lower right end in each group such as the pixel 43 (FIG. 6) among the pixels of the group (that is, data of total 76,800 pixels) is displayed during the third period. An image only made from data of a pixel located at the lower left end in the group such as the pixel 44 (FIG. 6) among the pixels of each group (that is, data of total 76,800 pixels) is displayed during the fourth period. Thus, data of all the pixels (data of 307,200 pixels) included in the VGA image data 22 are displayed time-divisionally and repeatedly in sequential order on the LCD screen 24.

Focusing attention on each individual pixel of the LCD screen 24, data displayed time-divisionally are the data of the pixels being mutually adjacent on the screen (the pixels in the same group) of the VGA image data 22. For example, focusing attention on the pixel 45 of FIG. 6, data displayed time-divisionally are the data of pixels 41, 42, 43 and 44 which are the pixels mutually adjacent on the screen of the VGA image data 22. A specific feature point of the images of mutually adjacent pixels is extracted and perceived inside the human brain.

Figure 9:
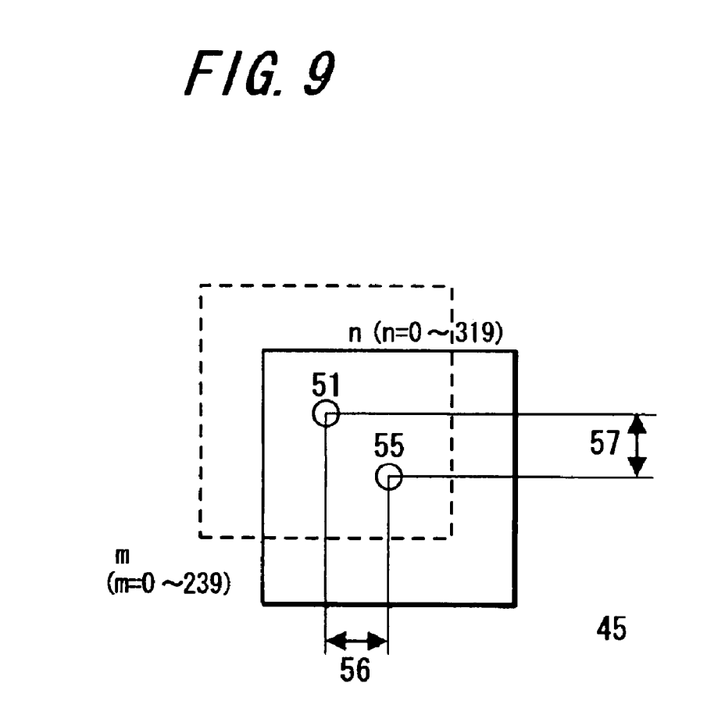
FIG. 9 is a diagram showing a deviation between a pixel position on the LCD screen and a position where the VGA image data should be displayed.

Specifically, as shown in a diagram on the left side of FIG. 9, a center point 51 that is the center point of the position of the pixel 41 normally displayed in the VGA image data 22 has one-quarter pixel deviation 56 (one quarter of one side of the pixel 45) in the horizontal direction of the screen and has one-quarter pixel deviation 57 in the vertical direction of the screen, from a center point 55 of the pixel 45 of the coordinates (n, m).

Further, as shown in a diagram on the right side of FIG. 9, a center point 52 that is the center point of the position of the pixel 42 normally displayed in the VGA image data 22 has one-quarter pixel deviation 58 in the horizontal direction of the screen (deviation in the direction opposite to that of the pixel 41) and has one-quarter pixel deviation 59 in the vertical direction of the screen, from the center point 55 of the pixel 45 of the coordinates (n, m).

Further, as shown in the diagram on the right side of FIG. 9, a center point 53 that is the center point of the position of the pixel 43 normally displayed in the VGA image data 22 has one-quarter pixel deviation 60 in the horizontal direction of the screen (deviation in a direction opposite to that of the pixel 41) and has one-quarter pixel deviation 61 in the vertical direction of the screen (deviation in a direction opposite to that of the pixel 41), from the center point 55 of the pixel 45 of the coordinates (n, m).

Further, as shown in the diagram on the right side of FIG. 9, a center point 54 that is the center point of the position of the pixel 44 normally displayed in the VGA image data 22 has one-quarter pixel deviation 62 in the horizontal direction of the screen and has one-quarter pixel deviation 63 (deviation in a direction opposite to that of the pixel 41) in the vertical direction of the screen, from the center point 55 of the pixel 45 of the coordinate (n, m).

The images of the pixels 41 through 44 being mutually adjacent on the screen are thus displayed time-divisionally and sequentially on the same pixel 45 of the LCD screen 24, and so the images of the pixels 41 through 44 are perceived inside the human brain with deviations being corrected. Specifically, these images are perceived by correcting deviations of the center points 51 through 54, which are the center points of the positions of the pixels 41 through 44 normally displayed in the VGA image data 22, from the center point 55 of the pixel 45. As a result, it is possible to obtain high resolution feeling comparable to the original VGA image data 22.

Hence, when the VGA image data 22 are input to and displayed on the mobile phone unit 23 having a limited size of the LCD screen 24, higher resolution feeling can be obtained in comparison to a case such as related art that performs scaling.

Here, when the time-divisional display is thus performed, it is desirable that the sequence of display (the order of reading data from the memory 18 in FIG. 5) is decided such that data of pixels close to each other on the screen among the pixels of the same group in the VGA image data 22 are displayed consecutively in order to facilitate a vision to visually follow the deviation of images.

For example, observing the center points 51 through 54 that are the center points of the positions of the pixels 41 through 44 normally displayed in the VGA image data 22 as shown in FIG. 9, each of distance between the center points 51 and 52, distance between the center points 52 and 53, distance between the center points 53 and 54 and distance between the center points 54 and 51 corresponds to one side of a square. Therefore, each of the distances is shorter than distance between the center points 51 and 53 and distance between the center points 52 and 54 (corresponding to diagonal lines of the square). Specifically, distance between the pixels 41 and 42, distance between the pixels 42 and 43, distance between the pixels 43 and 44 and distance between the pixels 44 and 41 are shorter than distance between the pixels 41 and 43 and distance between the pixels 42 and 44.

Figure 10:
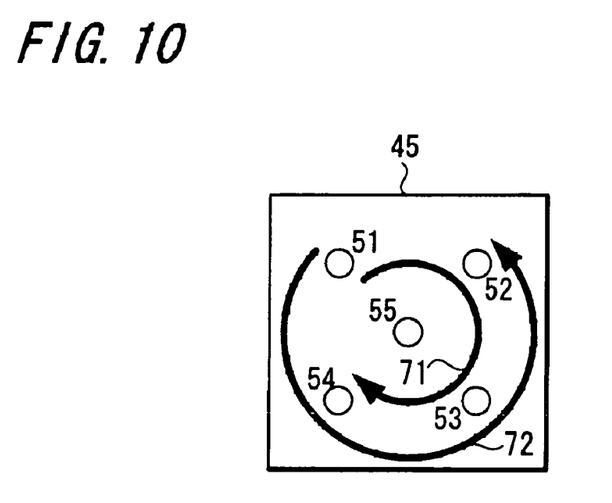
FIG. 10 is a diagram showing the sequence of pixels of the VGA image data to be displayed on the LCD screen.

Then, it is desirable to display in the order of pixels 41, 42, 43 and 44 in a manner drawing a circle clockwise (in the method shown in FIG. 7, the display is performed in this order), or to display in the order or pixels 41, 44, 43 and 42 in a manner drawing a circle counterclockwise. FIG. 10 is a diagram in which the pixels 41 through 44 are represented by the respective center points 51 through 54, and the clockwise order and counterclockwise order are drawn with arrows 71 and 72, respectively. In the case where the display is performed as described above, a moving distance for a vision to follow in one cycle (from the start of the first period until the end of the fourth period) becomes equivalent to two pixels (two times of one side of the pixel 45) and becomes shorter than that in a case that the display is performed in another order.

In addition, it is desirable that respective lengths of the first period, second period, third period and fourth period shown in FIG. 7 are set equal to one another.

Further, the length of each period can be decided appropriately according to processing capacity of the signal processing LSI 15, panel driver 16 and display panel 17, and can be decided appropriately so as to be viewed naturally. However, it is desirable that the length of each period (the first period through the fourth period) is decided correspondingly to a frame cycle of the display panel 17 in view of processing in the panel driver 16 and display panel 17. In the case where the mobile phone unit 23 has function of receiving an image of a television signal of NTSC standard (59.94 Hz), for example, it is desirable that the length of each period is set into 1/59.94 sec (the length of one cycle of the time-divisional display is about 1/15 sec).

In the embodiment described hereinbefore, all the data of four pixels in each group are displayed time-divisionally. Next, embodiments of displaying time-divisionally data of two pixels from each group, while keeping the number of pixels of one group to be four, are further explained, in which the processing of the signal processing LSI 15 is modified.

Figure 11:
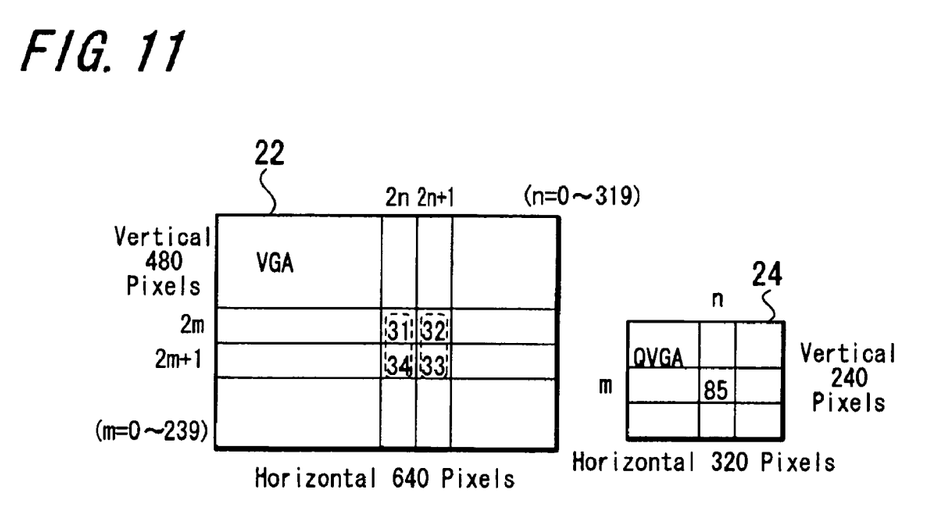
FIG. 11 is a diagram showing an example of pixels of VGA image data and LCD screen.
Figure 12:
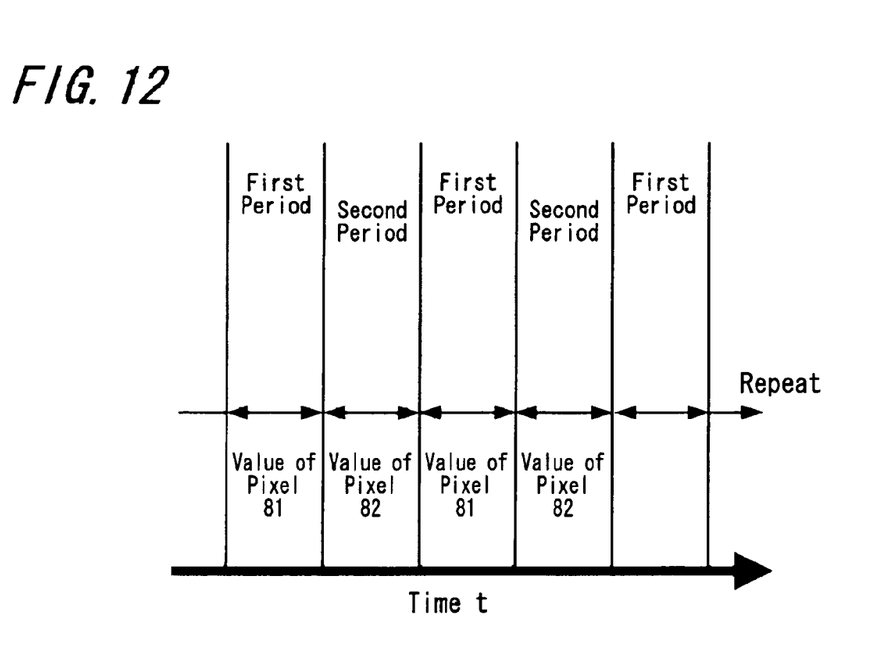
FIG. 12 is a diagram showing a method of displaying time-divisionally on one pixel of the LCD screen in FIG. 11.

FIGS. 11 and 12 show an embodiment in which resolution feeling only in the horizontal direction is improved. In this case, as shown on the left side of FIG. 11, data of pixel 31 and pixel 34 being mutually adjacent in the vertical direction among four pixels (pixels 31, 32, 33 and 34) located at positions of horizontal 2n, 2n+1 and vertical 2m, 2m+1 of the VGA image data 22 are read out from the memory 18 in FIG. 5 and an average value thereof is obtained to produce data of a new pixel (pixel 81 in FIG. 12). Similarly, data of pixel 32 and pixel 33 being mutually adjacent in the vertical direction are read out from the memory 18 and an average value thereof is obtained to produce data of a new pixel (pixel 82 in FIG. 12).

Then, the data of the new pixels 81 and 82 are displayed time-divisionally and sequentially on a pixel 85 located at a position of horizontal n and vertical m of the LCD screen 24 as shown on the right side of FIG. 11. Specifically, one cycle is divided into two periods (first period and second period) as shown in FIG. 12, and the data of the new pixel 81 is displayed on the pixel 85 during the first period and the data of the new pixel 82 is displayed on the pixel 85 during the second period. Further, this cycle of the first period and second period is repeated. In this case also, it is desirable that a length of the first period and a length of the second period are set equal to each other.

The following table 3 shows a specific example of the values displayed on this pixel 85. When the values of the pixels 31 through 34 are RGB values of eight bits (0 through 255) as shown in the second through fifth rows of this table, the RGB values of the pixel 85 become values in the sixth row of this table during the first period and become values in the bottom row of this table during the second period.

TABLE 3

|  | R | G | B |
|---|---|---|---|
| Value of Pixel 31 | 0 | 0 | 0 |
| Value of Pixel 32 | 63 | 255 | 0 |
| Value of Pixel 33 | 127 | 0 | 255 |
| Value of Pixel 34 | 0 | 255 | 255 |
| RGB Value of Pixel 85 during First Period | 0 | 127 | 127 |
| RGB Value of Pixel 85 during Second Period | 95 | 127 | 127 |

Although one pixel 85 of the LCD screen 24 is described hereinbefore, similar processing is performed with respect to all the values of n=0 through 319 and m=0 through 239, so that data of pixels being mutually adjacent in the horizontal direction in the VGA image data 22 are displayed time-divisionally and repeatedly in sequential order on the LCD screen 24.

Figure 13:
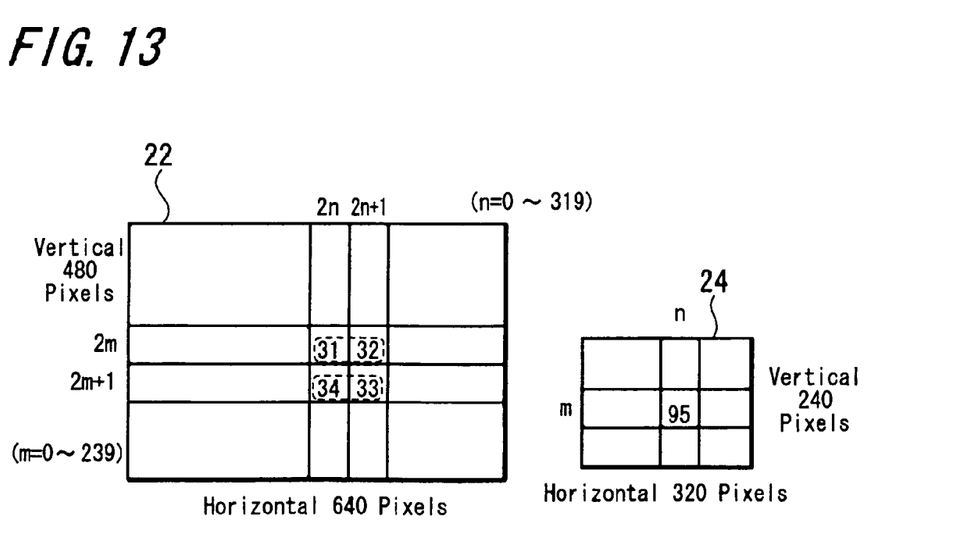
FIG. 13 is a diagram showing an example of pixels of VGA image data and LCD screen.
Figure 14:
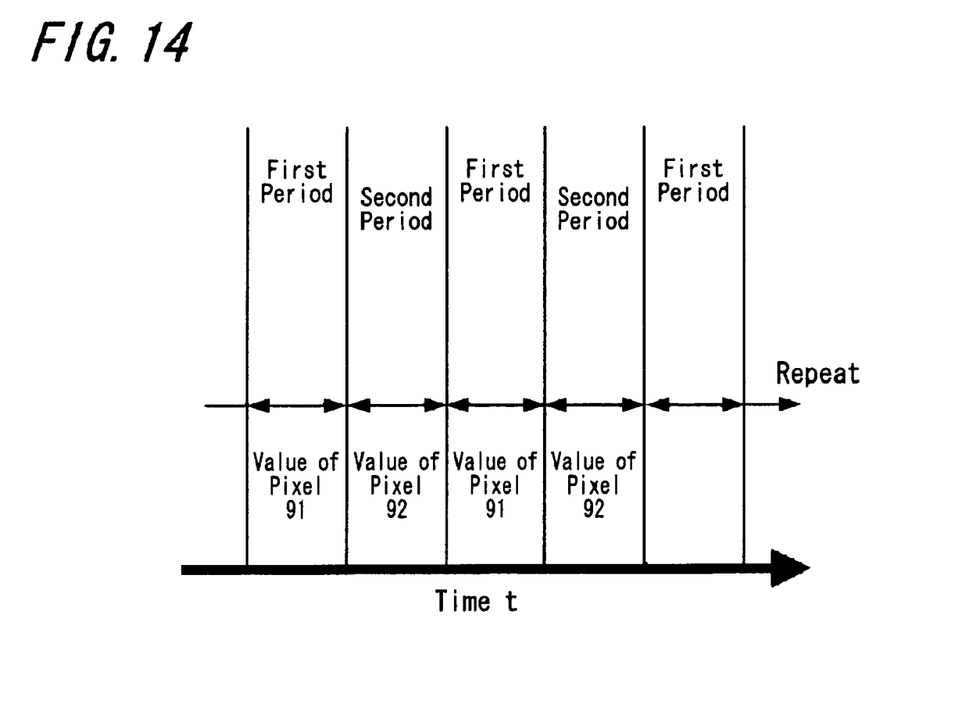
FIG. 14 is a diagram showing a method of displaying time-divisionally on one pixel of the LCD screen in FIG. 13.

FIGS. 13 and 14 show an embodiment in which resolution feeling only in the vertical direction is improved. In this case, as shown on the left side of FIG. 13, data of pixel 31 and pixel 32 being mutually adjacent in the horizontal direction among four pixels (pixels 31, 32, 33 and 34) located at positions of horizontal 2n, 2n+1 and vertical 2m, 2m+1 of the VGA image data 22 are read out from the memory 18 in FIG. 5 and an average value thereof is obtained to produce data of a new pixel (pixel 91 in FIG. 14). Similarly, data of pixel 33 and pixel 34 being mutually adjacent in the horizontal direction are read out from the memory 18 and an average value thereof is obtained to produce data of a new pixel (pixel 92 in FIG. 14).

Then, the data of the new pixels 91 and 92 are displayed time-divisionally and sequentially on a pixel 95 located at a position of horizontal n and vertical m of the LCD screen 24 as shown on the right side of FIG. 13. Specifically, one cycle is divided into two periods (first period and second period) as shown in FIG. 14, and the data of the new pixel 91 is displayed on the pixel 95 during the first period and the data of the new pixel 92 is displayed on the pixel 95 during the second period. Further, this cycle of the first period and second period is repeated. In this case also, it is desirable that a length of the first period and a length of the second period are set equal to each other.

The following table 4 shows a specific example of the values displayed on this pixel 95. When the values of the pixels 31 through 34 are RGB values of eight bits (0 through 255) as shown in the second through fifth rows of this table, the RGB values of the pixel 95 become values in the sixth row of this table during the first period and become values in the bottom row of this table during the second period.

TABLE 4

|  | R | G | B |
|---|---|---|---|
| Value of Pixel 31 | 0 | 0 | 0 |
| Value of Pixel 32 | 63 | 255 | 0 |
| Value of Pixel 33 | 127 | 0 | 255 |
| Value of Pixel 34 | 0 | 255 | 255 |
| RGB Value of Pixel 95 during First Period | 31 | 127 | 0 |
| RGB Value of Pixel 95 during Second Period | 63 | 127 | 255 |

Although one pixel 95 of the LCD screen 24 is described hereinbefore, similar processing is performed with respect to all the values of n=0 through 319 and m=0 through 239, so that data of pixels being mutually adjacent in the vertical direction in the VGA image data 22 are displayed time-divisionally and repeatedly in sequential order on the LCD screen 24.

Figure 15:
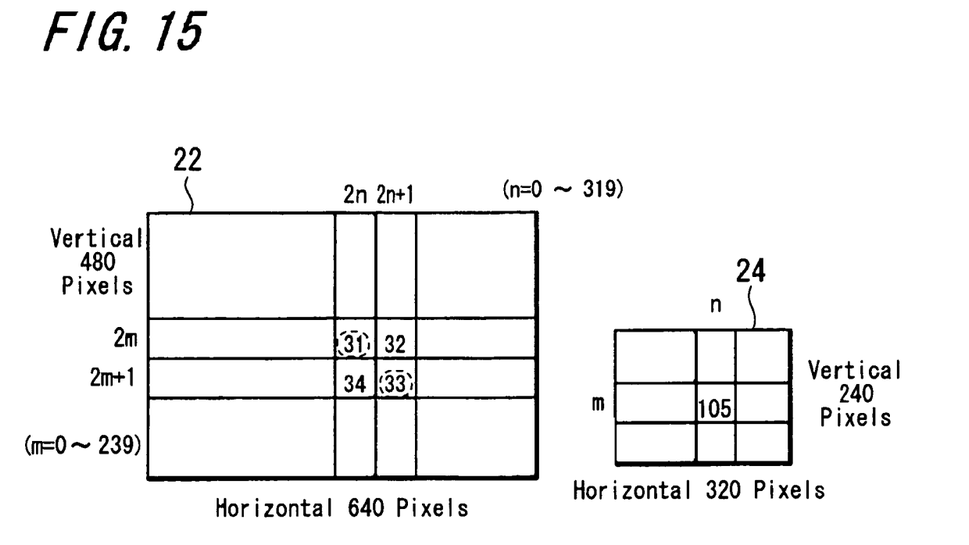
FIG. 15 is a diagram showing an example of pixels of VGA image data and LCD screen.
Figure 16:
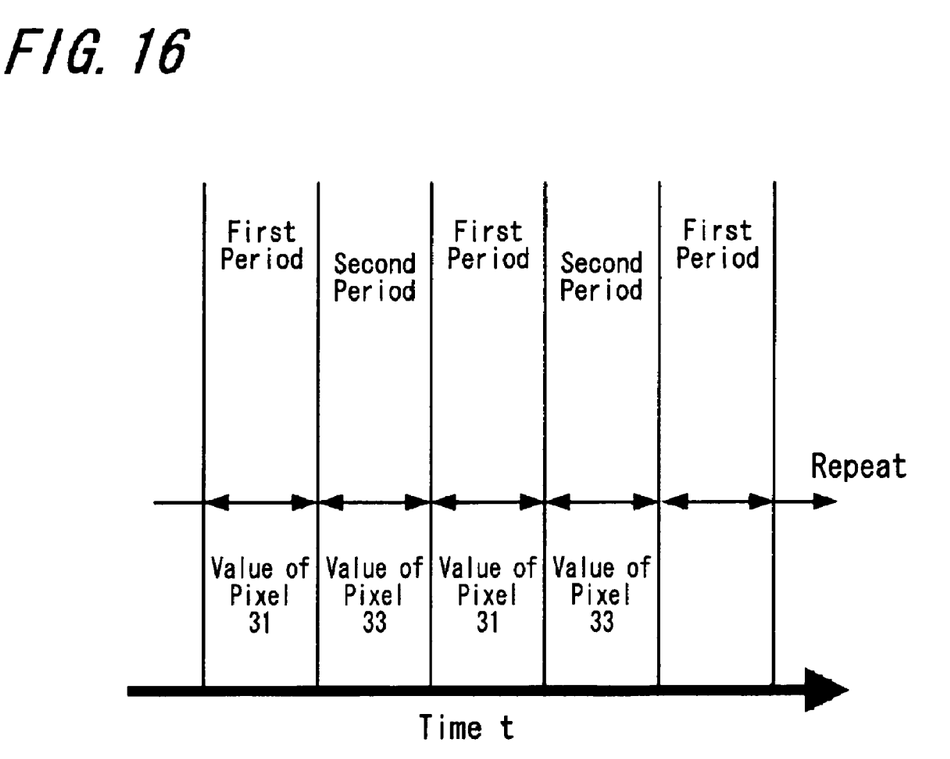
FIG. 16 is a diagram showing a method of displaying time-divisionally on one pixel of the LCD screen in FIG. 15.

FIGS. 15 and 16 show an embodiment in which resolution feeling in both the horizontal direction and the vertical direction is improved by performing further simplified processing in comparison to a case such as related art that performs scaling, although the improved resolution is not comparable with the resolution of the original VGA image data 22. In this case, as shown on the left side of FIG. 15, data of pixel 31 and pixel 33 are displayed time-divisionally and sequentially on a pixel 105 located at a position of horizontal n and vertical m of the LCD screen 24 as shown on the right side of FIG. 15. Here, the pixels 31 and 33 are two pixels having mutually different positions in both the horizontal direction and the vertical direction among four pixels (pixels 31, 32, 33 and 34) located at positions of horizontal 2n, 2n+1 and vertical 2m, 2m+1 of the VGA image data 22.

Specifically, one cycle is divided into two periods (first period and second period) as shown in FIG. 16, and the data of the pixel 31 is read out from the memory 18 in FIG. 5 to be displayed on the pixel 105 during the first period, and the data of the pixel 33 is read out from the memory 18 to be displayed on the pixel 105 during the second period. Further, this cycle of the first period and second period is repeated. In this case also, it is desirable that a length of the first period and a length of the second period are set equal to each other.

The following table 5 shows a specific example of the values displayed on this pixel 105. When the values of the pixels 31 through 34 are RGB values of eight bits (0 through 255) as shown in the second through fifth rows of this table, the RGB values of the pixel 105 become values in the sixth row of this table during the first period and become values in the bottom row of this table during the second period.

TABLE 5

|  | R | G | B |
|---|---|---|---|
| Value of Pixel 31 | 0 | 0 | 0 |
| Value of Pixel 32 | 63 | 255 | 0 |
| Value of Pixel 33 | 127 | 0 | 255 |
| Value of Pixel 34 | 0 | 255 | 255 |
| RGB Value of Pixel 105 during First Period | 0 | 0 | 0 |
| RGB Value of Pixel 105 during Second Period | 127 | 0 | 255 |

Although one pixel 105 of the LCD screen 24 is described hereinbefore, similar processing is performed with respect to all the values of n=0 through 319 and m=0 through 239, so that data of half the pixels existing in a scattered manner on the screen among data of all the pixels of the VGA image data 22 are displayed time-divisionally and repeatedly in sequential order on the LCD screen 24.

Hence, since the number of pixel data read out from the memory 18 becomes small, the resolution feeling in both the horizontal direction and the vertical direction can be improved by further simplified processing in comparison to the case such as related art that performs scaling, although the improved resolution is not comparable with the resolution of the original VGA image data 22.

Note that the resolution feeling can be improved similarly when the data of the pixel 32 and pixel 34 are displayed time-divisionally and sequentially on the pixel 105 of the LCD screen 24 instead of the data of the pixel 31 and pixel 33 among the four pixels 31 through 34 shown on the left side of FIG. 15.

In the embodiments described hereinbefore, after the VGA image data 22 are written in the memory 18 without modification, the VGA image data 22 are categorized into the data for each period (in the embodiment of FIGS. 6 to 8, the data for the first period through fourth period) and are read out sequentially from the memory 18. On the contrary, it is also possible that the VGA image data 22 are written in the memory 18 after the image data are categorized into data for each period (in the embodiment of FIGS. 6 to 8, into the image data for the first period, second period, third period and fourth period) and the categorized data are sequentially read out from the memory 18.

Further, examples for displaying image data of VGA size on the display device of QVGA size are explained in the above-described embodiments. However, an embodiment of the present invention is not limited thereto, but can be applied to all the cases where image data are displayed on a display device having resolution lower than that of the image data. In those cases, the image data are displayed by deciding the number of pixels of the image data to be displayed time-divisionally on one pixel of the display device (the number of pixels of the image data to be included in one group such as the pixels 41 through 45 of the embodiment in FIGS. 6 to 8) according to a ratio between the resolution of image data and the resolution of display device.

For example, according to an embodiment of the present invention, image data photographed with a digital camera having an imaging device of 8 million pixels or 16.7 million pixels can be displayed on a display device having resolution lower than that of the image data. Furthermore, according to an embodiment of the present invention, in a television system having resolution of HD full standard (equivalent to 1,920×1,080=2,073,600 pixels) are displayed image data of resolution higher than that resolution. Moreover, according to an embodiment of the present invention, on a monitor of a personal computer are displayed image data of higher resolution than that monitor.

Accordingly, even in the case that it is physically possible to use a display device of high resolution such as a television system and a personal computer, high resolution feeling can be obtained still using a display device of low resolution (therefore, without incurring a cost increase).

Here, when a series of processing is executed by software, a program constituting the software is installed from a network and a recording medium into a computer that is built in dedicated hardware or into an apparatus such as a general-purpose personal computer, for example, that is capable of executing various functions with various programs being installed. A magnetic disc (including a floppy disc), an optical disc (including CD-ROM (Compact Disc-Read Only Memory) and DVD (Digital Versatile Disc)), a magneto-optical disc (including MD (Mini-Disc)), or a packaged medium made of a semiconductor memory and the like, on which the program is recorded, are used as the recording medium.

In addition, although the examples for displaying a still image are explained in the above-described embodiments, an image that can be displayed according to an embodiment of the present invention is not limited to still images. Even in the case of a moving image, image data of each frame are time-divisionally displayed in real time correspondingly to a frame rate of the moving image (for example, 59.94 Hz in case of NTSC standard). Specifically, similarly to the embodiments in which high resolution feeling is obtained in still images, a display that has high resolution feeling becomes possible by displaying time-divisionally the image data of the relevant frame at a frame rate of an integral multiple of the moving image for one frame cycle (a frame rate of four times when data of four pixels are time-divisionally displayed similarly to the embodiment of FIGS. 6 to 8, for example).

Further, the image data to be processed according to an embodiment of the present invention may be both of a luminance signal and a color-difference signal, or either one of the luminance signal and the color-difference signal in YUV (luminance, color-difference) signals, and further may be signals of all colors or signals of specific one or two colors in RGB signals.

Furthermore, the cases in which image data include pixel data of an integral multiple of the resolution (the number of pixels) of display device are explained in the embodiments described hereinbefore. However, the number of pixels in an input video signal may not be the integral multiple of the resolution (the number of pixels) of display device. According to an embodiment of the present invention, image data of an integral multiple of the resolution (the number of pixels) of display device are generated from an input video signal by way of interpolation processing to be displayed time-divisionally and sequentially on one pixel of the display device based on the interpolated data.

It should be understood by those skilled in the art that various modifications, combinations, sub-combinations and alterations may occur depending on design requirements and other factors insofar as they are within the scope of the appended claims or the equivalents thereof.

The invention claimed is:

1. An image processing apparatus capable of displaying image data on a display device that has resolution lower than that of the image data, comprising:
    a processor for categorizing image data of one screen into a plurality of groups by setting four pixels of the image data being mutually adjacent on the screen as one group and for outputting data to be displayed time-divisionally and sequentially on one pixel of the display device respectively based on data of the pixels in each of said groups,
    whereby the data that is time-divisionally and sequentially displayed is displayed on said one pixel such that the input to the one pixel changes time-divisionally and sequentially but the position on the display at which the time-divisional, sequential data is displayed does not change, such that the one pixel of the display device is on during the entire time that the data is displayed on the display device,
    the display time for each unit of data that is time-divisionally and sequentially displayed is determined according to a processing capacity of the processor, a panel driver, and a display panel,
    the data that is time-divisionally and sequentially displayed is displayed such that a moving distance for a vision to follow during display of a group is equivalent to two pixels.

2. An image processing apparatus according to claim 1, wherein said processor outputs data of all the pixels in each group as data to be displayed time-divisionally and sequentially on one pixel of the display device respectively.

3. An image processing apparatus according to claim 2, wherein said processor consecutively outputs data of pixels being mutually adjacent in the horizontal direction or in the vertical direction in the same group as said image data.

4. An image processing apparatus according to claim 1, wherein image data of an integral multiple of the resolution of the display device in the horizontal direction and/or the vertical direction are prepared by interpolating an input video signal, and
    said processor outputs data to be displayed time-divisionally and sequentially on one pixel of the display device based on the prepared image data.

5. An image processing method capable of displaying image data on a display device that has resolution lower than that of the image data, comprising the steps of:
    categorizing image data of one screen into a plurality of groups by setting four pixels of the image data being mutually adjacent on the screen as one group; and
    outputting data to be displayed time-divisionally and sequentially on one pixel of the display device respectively based on data of the pixels in each of said groups,
    whereby the data that is time-divisionally and sequentially displayed is displayed on said one pixel such that the input to the one pixel changes time-divisionally and sequentially but the position on the display at which the time-divisional, sequential data is displayed does not change, such that the one pixel of the display device is on during the entire time that the data is displayed on the display device,
    the display time for each unit of data that is time-divisionally and sequentially displayed is determined according to a processing capacity of a processor that performs said categorizing and outputting, a panel driver, and a display panel,
    the data that is time-divisionally and sequentially displayed is displayed such that a moving distance for a vision to follow during display of a group is equivalent to two pixels.

6. A non-transitory recording medium containing a program which, if executed, performs:
    a procedure for categorizing image data of one screen into a plurality of groups by setting four pixels of image data being mutually adjacent on a screen as one group; and
    a procedure for outputting data to be displayed time-divisionally and sequentially on one pixel of a display device respectively based on data of the pixels in each of said groups,
    whereby the data that is time-divisionally and sequentially displayed is displayed on said one pixel such that the input to the one pixel changes time-divisionally and sequentially but the position on the display at which the time-divisional, sequential data is displayed does not change, such that the one pixel of the display device is on during the entire time that the data is displayed on the display device, the display time for each unit of data that is time-divisionally and sequentially displayed is determined according to a processing capacity of a processor that performs said categorizing and outputting, a panel driver, and a display panel,
    the data that is time-divisionally and sequentially displayed is displayed such that a moving distance for a vision to follow during display of a group is equivalent to two pixels.

* * * * *